United States Patent [19]

Rudorfer et al.

[11] 4,022,581

[45] May 10, 1977

[54] DEVICE FOR THE RECOVERY OF NOBLE METALS

[75] Inventors: Hermann Rudorfer; Anton Wagner; Franz Prammer, all of Linz; Friedrich Klausner, Pasching, all of Austria

[73] Assignee: Chemie Linz Aktiengesellschaft, Linz, Austria

[22] Filed: Jan. 29, 1976

[21] Appl. No.: 653,626

Related U.S. Application Data

[62] Division of Ser. No. 487,803, July 11, 1974, Pat. No. 3,954,449.

[30] Foreign Application Priority Data

July 13, 1973  Germany ........................... 2335712

[52] U.S. Cl. ............................................. 23/288 R
[51] Int. Cl.² ..................... B01J 8/00; B01D 39/06; B01D 46/30
[58] Field of Search ............ 75/25, 83, 101 R, 121; 423/22; 23/288 R; 55/72, 350, 387, 484

[56] References Cited

UNITED STATES PATENTS

| | | | |
|---|---|---|---|
| 2,226,113 | 12/1940 | Chastain, Jr. ...................... | 75/83 X |
| 2,226,149 | 12/1940 | Zimmermann ................. | 75/83 UX |
| 2,648,393 | 8/1953 | Holzmann ..................... | 23/288 R X |
| 3,466,151 | 9/1969 | Sicard et al. ..................... | 23/288 R |
| 3,515,541 | 6/1970 | Wimmer et al. ....................... | 75/83 |
| 3,627,497 | 12/1971 | Klein et al. ..................... | 23/288 R |

*Primary Examiner*—Joseph Scovronek
*Attorney, Agent, or Firm*—Wenderoth, Lind & Ponack

[57] ABSTRACT

A device for the recovery of noble metals emanating from the surface of catalysts used in high pressure gas reactions involving absorbing the noble metal dispersed in the reaction gas in an intercepting bed formed of acid-soluble metal oxides in which the external boundary surface of the intercepting bed is 1.5 to 20 times the cross-sectional area of the catalyst surface. The thickness of the intercepting bed, in the direction of gas flow through the material thereof, is 20 to 40 mm., and the flow of the reaction gases in the intercepting bed is in a direction parallel to the plane of the supporting base of the bed.

6 Claims, 10 Drawing Figures

DEVICE FOR THE RECOVERY OF NOBLE METALS

This is a division of application Ser. No. 487,803, filed July 11, 1974, now U.S. Pat. No. 3,954,449 issued May 4, 1976.

BACKGROUND OF THE INVENTION

This invention relates to a device for the recovery of noble metals, and particularly the recovery of noble metals which have volatilised or become detached in a very finely divided state from the surface of noble metal catalyst gauzes used in high pressure exothermic gas reactions.

U.S. Pat. No. 2,920,953 in the name of H. Rudorfer discloses that noble metals, particularly metals of the platinum group, which volatilise from the surface of noble metal catalysts in exothermic gas reactions, may be recovered if a granular layer of acid-soluble oxides of alkaline earth metals or of heavy metals, preferably of oxides which have been formed in situ from the corresponding carbonates, for example marble, is placed in the reaction furnace on the outlet side of the noble metal catalyst surfaces. The noble metal thus precipitated on the granular material, in the case of platinum, for example, as the platinate, then may be recovered in a simple manner by dissolving the granular intercepting material in acid. In the above mentioned patent it is also recommended, inter alia, that the granular mass should be covered on the gas inlet side with a foil of material stable at red heat, provided with holes or slits, and it is also explained that a decrease in the gas resistance may be achieved by a so-called "arrangement of the resistance", that is to say by enlarging the surface for the passage of gas by giving the intercepting layer, for example, a wavy or tubular shape. A bed thickness of 160 to 170 mm is recommended for the charge of intercepting material.

While the aforesaid known process has proved successful in practice for the recovery of noble metals in processes conducted under normal pressure, on the other hand, in processes which operate under increased pressure, for example pressures of 1 to 10 atmospheres gauge, difficulties have arisen, above all because the granular mass was so caked and consolidated, within a short period of time, that the gas resistance of the intercepting layer reached an intolerable level. The recovery process therefore could not be used in practice in processes operating under raised pressure. On the other hand, however, recovery of noble metal is of particular interest precisely in high pressure processes for ammonia combustion in view of the substantially higher losses of platinum (1.5g of Pt/tN at 5 atmospheres gauge as against 0.2 g of Pt/netric ton of nitrogen at 0.2 atmosphere gauge).

SUMMARY OF THE INVENTION

Surprisingly, it has now been found that caking and consolidation of the granular intercepting mass may be avoided even in high pressure processes if, on the one hand, the surface of the absorbing layer is enlarged 1.5 to 20 fold compared with the cross-sectional area of the catalyst bed, and, on the other hand, if the bed thickness of the granular absorbing material in the direction of gas flow therethrough is reduced to 20 to 40 mm. In this connection it is, however, essential that the gas on entering the absorbing layer is so directed that it has, at least temporarily a direction of flow parallel to the plane of the gauze or to the plane of the supporting base of the absorbing layer. Recovery figures of 90% and higher are achieved by this arrangment, which was particularly surprising, because previously it had been thought that such absorbing layers required bed thicknesses of at least 100 mm in order to obtain practicable recovery figures.

In accordance with the present invention there is provided a device for the recovery of noble metal which has volatised or become detached in a very finely divided state from the surface of a noble metal catalyst gauze in an exothermic gas reaction carried out under an excess pressure of at least 1 atmosphere gauge, during the use of which the gaseous reaction mixture is passed through an intercepting bed, which is installed in a zone at a temperature from about 600° to 900° C, preferably 800° to 900° C the bed comprising an absorbing layer of a collecting material which is easily permeable to gas and is composed of granular acid-soluble oxides of alkaline earth metals or heavy metals, which bed has an external boundary surface 1.5 to 20 times the cross-sectional area of the noble metal catalyst gauzes and a thickness in the direction of gas flow therethrough of 20 to 40 mm, the enlargement of the external boundary surface being achieved by means of depressions or prominences in the intercepting bed. The flow of the reaction gases is directed through the intercepting bed, at least temporarily, in a direction parallel to the plane of the gauze or the supporting base of the absorbing layer. Thereafter the noble metal is recovered by dissolving the collecting material in an acid after the intercepting action of the collecting material has been exhausted.

The invention is particularly applicable for the recovery of noble metals of the platinum group and also from high pressure processes involving the catalytic combustion of ammonia.

The collecting material used in the absorbing layer preferably comprise oxides which have been formed in situ from the corresponding carbonates, if desired, of natural origin.

The processing of the absorbing layer in order to recover the absorbed noble metal, e.g. platinum, is very simple and is carried out in the same manner as has already been mentioned in U.S. Pat. No. 2,929.953. The collecting material, for example granular calcium oxide, enriched with deposited platinum, is slaked with water and dissolved by means of dilute nitric acid, but the pH of the solution is not allowed to fall below 6 to 7 by the addition of acid. By this means the simultaneous dissolution of platinum metals is avoided. After filtering off the calcium nitrate solution, the filter residue, which contains the platinum and which represents 10 to 20% by weight of the exhausted collecting material, is then worked up into the pure noble metal in a known manner in a further operation.

The enlargement, according to the invention, of the external boundary surface of the absorbing layer, combined with the diversion of the gas in a direction parallel to the plane of the gauze, may be achieved in accordance with the invention by installing the absorbing material in areas or channels formed between gas-permeable walls, which channels are vertically supported on the supporting base of the bed and which are provided with separate suitable spaces or channels for the entry and exit of gas. Therefore, the present invention includes a device for carrying out the process described above, and which comprises an intercepting bed which rests upon a supporting base and which is composed of granular, acid-soluble oxides of alkaline earth metals or heavy metals. The bed is in the form of channels located and defined between gas-permeable walls which are vertically disposed and are supported on the supporting base. The bed channels are disposed across the entire cross-section of the furnace in a regular arrangement in the form of rings, a star, strips, hexagonal channels in the form of a honeycomb or symmetrically disposed tubes, with regularly distributed cavities arranged between them. The cavities are alternately open on an entrance side and on a gas exit side. Thus, the gas is forced to flow through the bed in a direction of gas flow running parallel to the supporting base, the clearance between the gas-permeable walls surrounding a given channel of granular material being 20 to 40 mm.

BRIEF DESCRIPTION OF THE DRAWINGS

The device according to the invention may have one of several different configurations. A number of preferred embodiments are illustrated in the accompanying drawings, wherein FIGS. 1a and 1b are respectively transverse and longitudinal sections of a bed in the form of strips;

FIGS. 2a and 2b are respectively transverse and longitudinal sections of a bed in the form of concentric rings;

DETAILED DESCRIPTION OF THE INVENTION

Figure 1A:
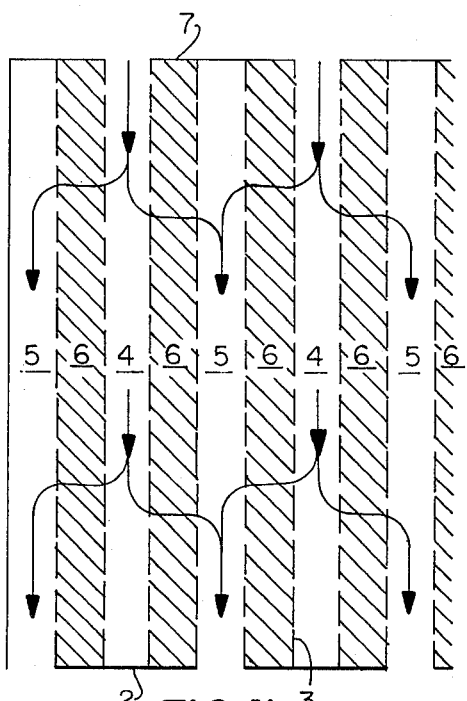
Figure 1A:
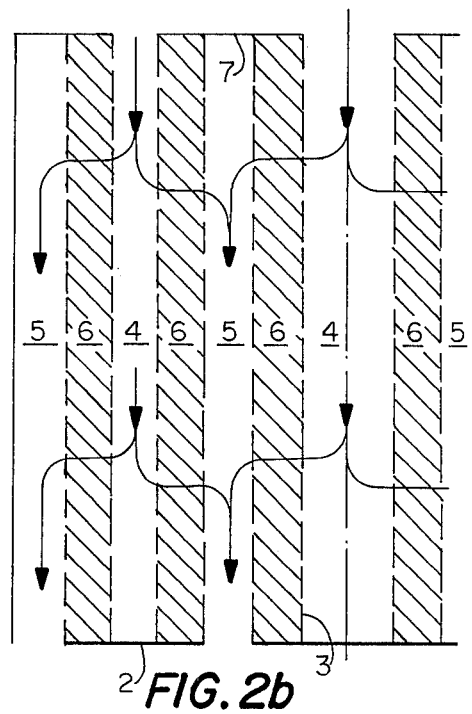
Figure 1A:
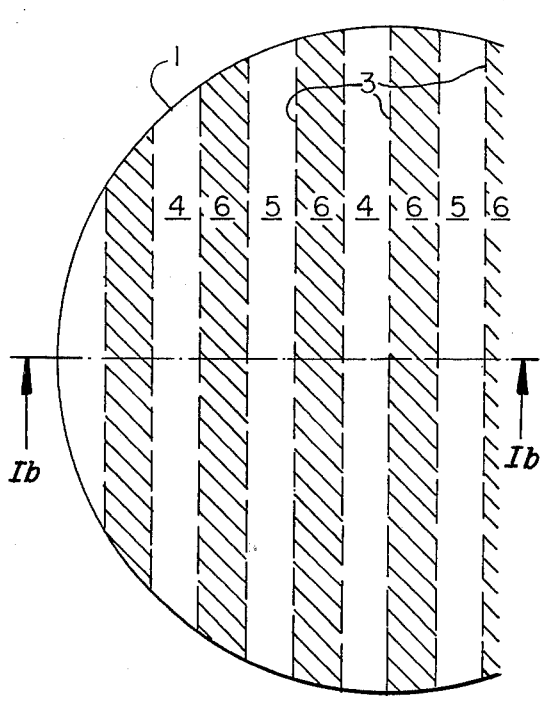

In each of the figures of the accompanying drawings 1 denotes a furnace or reaction chamber jacket, 2 denotes a supporting base for the intercepting aborbing bed, and 3 denotes vertical, gas-permeable walls enclosing granular collecting material.

With reference to FIGS. 1b, 2b, 3b, 4b and 5b, the bed of granular material extends transversely across the entire section of the furnace. Walls 3 extend tranverse to the plane of a noble metal gauze (not shown) through which the reaction gas passes before its entry into the intercepting bed. The walls 3 divide the bed into separate vertical channels. Certain of these channels are filled with the granular collecting material.

On opposite lateral sides of each material filled channel 6 is an open channel or space. Alternate open channels are gas inlet channels 4, which are open at the top of the bed to receive reactions gas having dispersed therein noble metal from the gauze (not shown), but which are closed at the bottom of the bed, as by supporting base 2 which also closes the bottom ends of the material filled channels 6.

The remaining open channels are gas outlet channels 5, which are closed at the top of the bed, as by gas tight covers or plates 7 which also close the top ends of the material filled channels 6, but which are open at the bottom of the bed to allow the exit therefrom of reaction gas, after the noble metal previously dispersed therein has been absorbed by the granular collecting material.

Thus, reaction gas having dispersed therein noble metal enters the bed through inlet channels 4. The gas in a given channel 4 is forced in a direction parallel to the plane of the nobel metal gauze (not shown) and parallel to the plane of supporting base 2 through one of the material filled channels 6 adjacent such given channel 4, whereat the noble metal in the gas is absorbed, and into the next adjacent outlet channel 5. The gas then flows outwardly of the bed through the outlet channels 5.

In accordance with the invention, the thickness of the absorbing material of each material filled channel 6, in the direction of gas flow therethrough, is 20 to 40 mm.

By the above arrangement in accordance with the invention, the total incident surface of the absorbing bed is increased by 1.5 to 20 times the cross-sectional area of the noble metal catalyst gauze through which the reaction gas passes prior to its entry into the absorbing bed.

In further accordance with the present invention, the enlargement of the incident surface of the absorbing bed may be achieved by several spcific arrangements.

One embodiment for the enlargement of the incident surface of the absorbing material may be achieved by constructing cavities 4, 5 and 6 in the form of elongated channels arranged parallel to one another, each having a substantially narrow, rectangular cross-section. In this case the narrow end faces or plates 7 which are turned towards the catalyst gauze are made impermeable to gas, and the reaction gas passes preferentially aong the inlet channels 4 located between adjacent material filled channels 6, then in a lateral direction through the broad gas-permeable longitudinal walls 3 defining channels 6 filled with absorbing material, in order to flow on downwards through the interior space of outlet chamber (5), as illustrated in FIG. 1a and 1b.

Figure 2A:
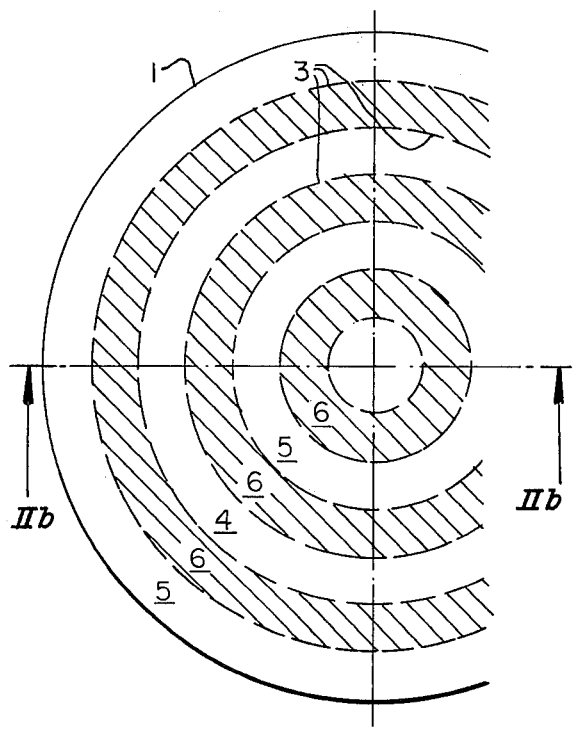

Other possible ways of providing the absorbing bed with an enlarged incident surface can also be easily achieved. Thus, for example, as illustrated in FIGS. 2a and 2b a profile structure consisting of concentric hollow cylindrically shaped channels, alternately with ring slots 4 providing inlets 4 and outlets 5 separated by absorbing material channels 6, has proved very successful for holding the absorbing material. The absorbing material, having a bed thickness of 20 to 30 mm, which is exposed to a radial flow through an incident surface increased by 7 to 15 times, is capable of absorbing practically all of the platinum losses from the catalyst gauze.

Figure 3B:
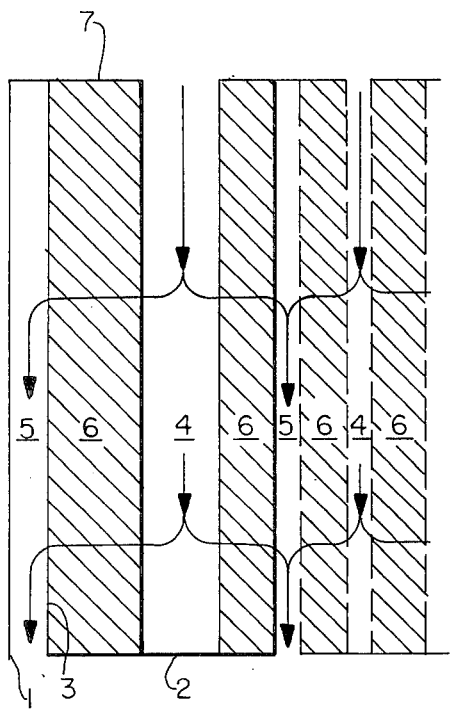
FIGS. 3a and 3b are respectively transverse and longitudinal sections of a bed in the form of a star.
Figure 3A:
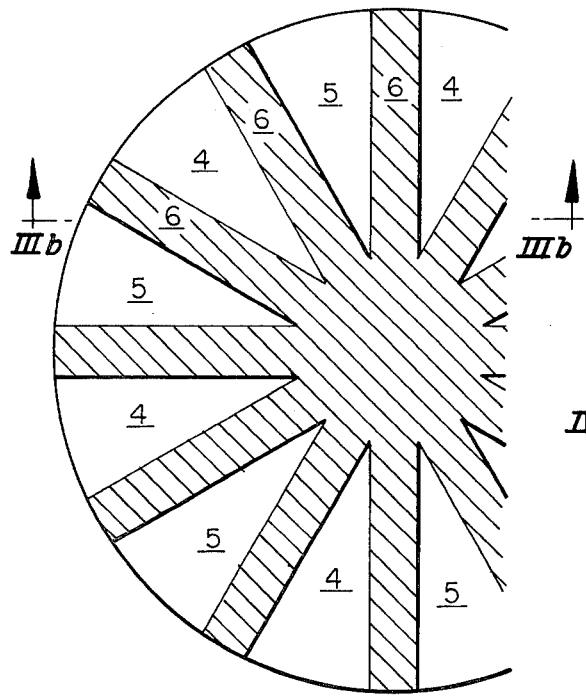

A symmetrical star shaped arrangement of channels extending radially outwardly from a central channel of circular sectional area of a combustion furnace also may be provided in an analogous manner, as illustrated in FIGS. 3a and 3b. It was possible to absorb, for recovery at a high yield (88%), the platinum losses from the catalyst on an incident surface which was enlarged 16 times compared with the normal level distribution of the absorbing material wherein the material filled channels 6 were arranged in a star shaped manner and wherein the thickness of the absorbing material in each channel 6, in the direction of gas flow therethrough, was 20 mm. The gas inlet and outlet channels 4 and 5 are sector-shaped and are provided alternately between the channels 6.

Figure 4B:
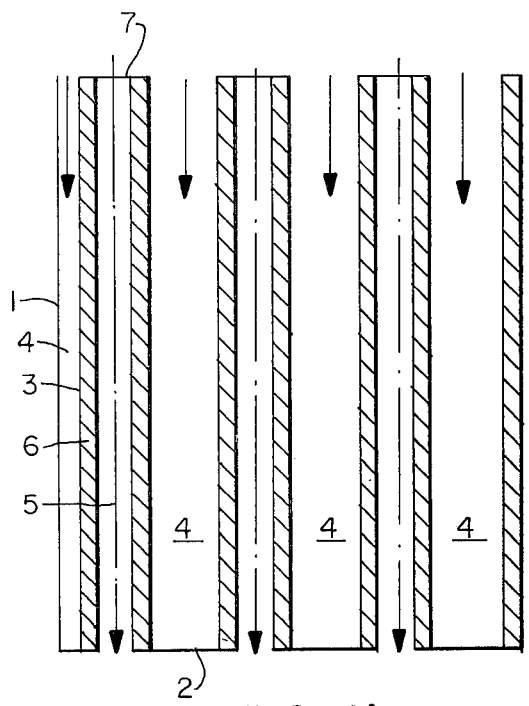
FIGS. 4a and 4b are respectively transverse and longitudinal sections of a bed in the form of symmetrically disposed tubes.
Figure 4A:
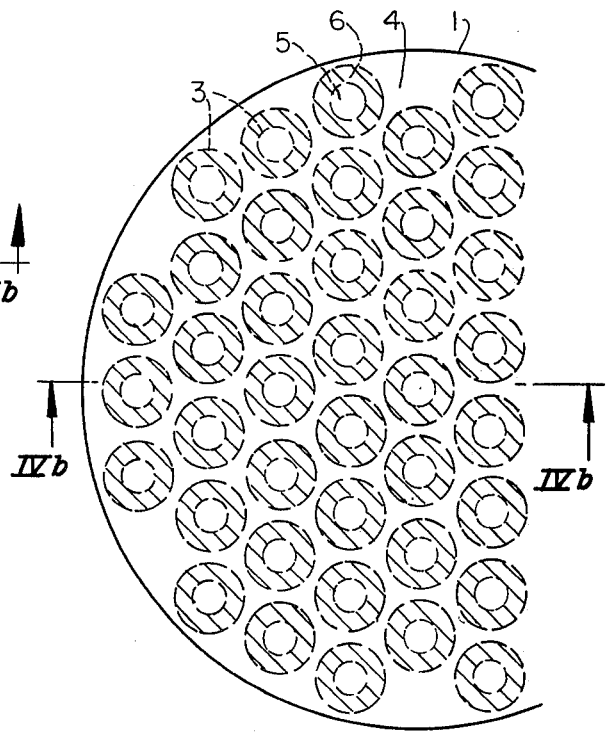

It is also possible to provide the absorbing material filled channels 6 in the form of coarse-pored hollow filter tubes arranged symmetrically and as close as possible to one another over the cross-sectional area of the furnace space. The gas inlet channel 4 for the reaction gas is the common space outwardly of all the hollow tubes. The gas flows radially inwardly through the absorbing material of the tubes into the outlet channels 5 internally of each hollow tube, as illustrated in FIGS. 4a and 4b.

Figure 5B:
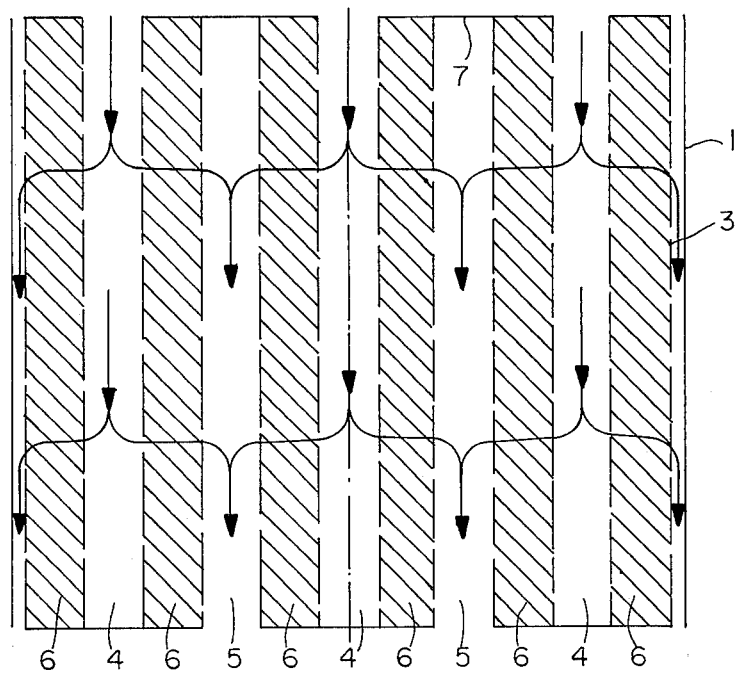
FIGS. 5a and 5b are respectively transverse and longitudinal sections of a bed in the form of a honeycomb.
Figure 5A:
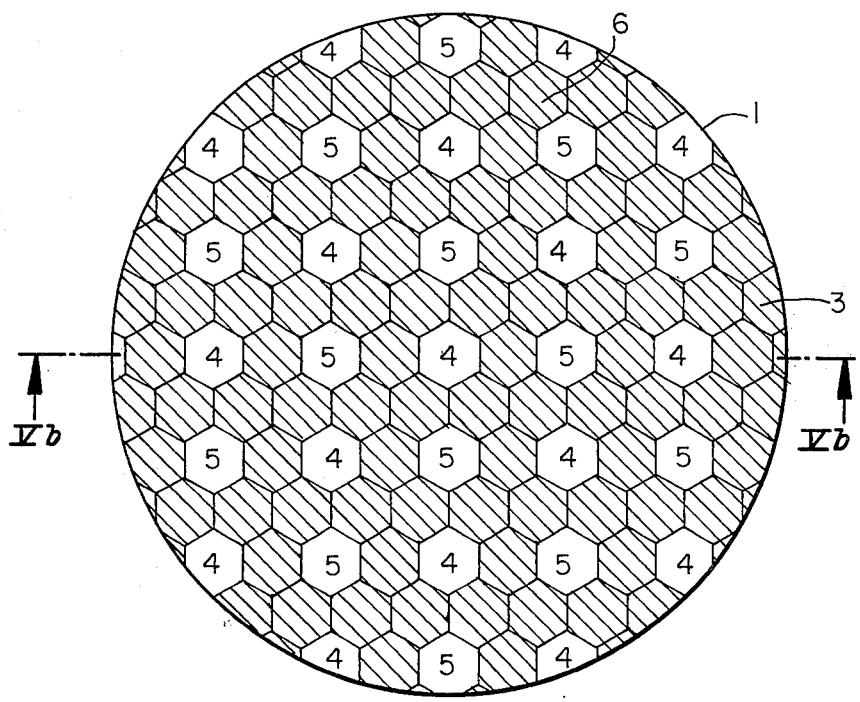

It is also possible to sub-divide the cross-sectional area of the furnace space by means of a plurality of vertically extending channels having a hexagonal shape, in the form of a honeycomb, as illustrated in FIGS. 5a and 5b.

In this embodiment 75% of the channels are material filled channels 6 which are sealed at their bottom ends by base 2 and at their top ends by cover 7. Half of the remaining hexagonal channels are sealed either at the base 2 or at the cover 7 and thus respectively form the gas inlet channels (4) and gas outlet channels 5 which are arranged symmetrically between the channels 6 in such a way that they are each completely surrounded by filled channels 6. This arrangement results in the reaction gas being able to enter through an inlet channel (4) and to flow through the coarse-pored side walls 3 into the material filled channels 6 which completely enclose each inlet channels 4, in order to be able to emerge into one of the outlet channels 5 which are also completely enclosed by material filled channels 6. Although the incident surface is increased in this arrangement only 1.6 times compared with a completely plane, non-folded absorbing surface, nevertheless, practically complete recovery of 92.8% of the platinum losses from the gauze is achieved by the absorbing material, when the thickness of the material, in the direction of flow therethrough, is only 20 to 30 mm. Additionally, a lower resistance to flow is made possible. The life of the absorbing bed is also not endangered by consolidation caused by deposition of condensate arising from the vapour pressure of the reaction gas being temporarily exceeded, which of necessity will occur during essential interruptions in the operation of the pressure combination furnace.

The following Examples illustrate the invention and the manner in which it may be performed.

EXAMPLE 1

Prolonged experiments on the combustion of ammonia with air to give nitrous gases were carried out in an experimental pressure combustion furnace equipped with a platinum gauze bundle with a gauze surface of 2 dm$^2$ (200 cm$^2$) (diameter = 16 cm) at a pressure of 4.8 atmospheres gauge, and with the temperatures controlled at the platinum gauze and at the incident surface of a bed of granular calcium oxide which was placed below the gauze and which acted as an intercepting bed for platinum. While the parameters concerning the gauze surface and the operating pressure in the furnace remained the same in all the following experiments, the operating time, the ammonia throughput, the operating temperatures and especially the size of the incident surface was arranged in the form of concentric rings or hollow cylinders in accordance with FIGS. 2a and 2b. The reaction gas flowed, via the annular channels 4 located between adjacent concentric annular material filled channels 6, radially through the channels of calcium oxide, each of which was 30 mm thick and emerge into and flowed downwardly through the annular outlet channels 5. The incident surface was increased by a ratio of 1:14.3, compared with a plane bed arrangement to 28.6 dm$^2$.

Altogether 7,900 kg. of nitrogen as ammonia were passed through the furnace and burnt to give nitrous gases in an experiment lasting 452 hours. While the specific catalyst gauze through-put of 8.75 kg N/hour/dm$^2$ of gauze surface was nearly as high as in the case of a plane surface absorbing bed, the specific throughput of the absorbing material was reduced to 0.61 kg N/hour/dm$^2$ of incident surface as a result of the surface configuration indicated herein. The average gauze temperature was 860° C and that of the absorbing material was 822° C. There was a loss of 5,333 mg of Pt from the catalyst gauze, of which 4,834 mg was recovered by working up the absorbing material, which corresponds to a yield of 90.6%. The absorbing material displayed no tendency to cake. In contrast to this, a comparative experiment was carried out in which the incident surface of the absorbing bed was left as a plane surface (a 1:1 ratio to the platinum gauze surface of 2 dm$^2$) and the depth of the marble bed was 200 mm. 3,290 kg of nitrogen as ammonia were put through the furnace in an experiment lasting 176 hours, which corresponds to a specific throughput for the platinum gauze surface and equally for the absorbing incident surface of 9.36 kg N/hour/dm$^2$ of gauze surface. The average value measured for the gauze temperature was 905° C and for the temperature of the incident surface of the absorbing bed 770° C. After the conclusion of the experiment it was possible to determine a loss of 3,425 mg of platinum from the gauze, of which 2,284 mg was recovered after working up the absorbing bed, which corresponds to a yield of 66.4%. The absorbing material was so caked, even after an operating time of only 176 hours, that it was necessary to discontinue the experiment.

EXAMPLE 2

The incident surface of the absorbing bed, in an experimental pressure combustion furnace as described in the preceding example, was formed as illustrated in FIGS. 3a and 3b with radial channels 6 and sector-shaped channels 4 and 5 arranged therebetween. The thickness of each channel 6 of the absorbing bed was 20 mm., and the incident surface was increased from 2 dm$^2$ to 22 dm$^2$, in a ratio of 1:11, as compared with a plane surface. A total of 10,080 kg of nitrogen as ammonia was passed through, mixed with air, and oxidised to give nitrous gases in an experiment lasting 588 hours. The average temperature of the platinum gauze was 850° C and that of the absorbing material 830° C. A specific throughput at the catalyst gauze of 9.19 kg of N/hour/dm$^2$ of gauze surface could be calculated from the feed rate, and a throughput of 0.835 kg of N/hour/dm$^2$ of incident surface was calculated from the increased incident surface. In the course of running the experiment there was a total loss of 5,381 mg of Pt at the catalyst gauze bundle, of which altogether 5,128 mg. was recovered from the CaO absorbing material, after working up the latter, which corresponds to a recovery figure of 95.3%.

EXAMPLE 3

Using the same experimental furnace as in the previous Examples, the increase in the incident surface was achieved in this case by accommodating the absorbing bed in symmetrically arranged hexagonal channels as illustrated in FIGS. 5a and 5b, in such a way that empty hexagonal spaces, alternately open on the top but closed underneath i.e. inlet channels 4, closed at the top but open underneath i.e, outlet channels 5, were arranged at regular intervals between the channel 6 which were filled with absorbing material and which were covered in a gas-tight manner both above and below. The filled channels 6 were swept through laterally by the gas through the porous dividing walls from the empty inlet channels 4, and the gas then left the absorbing bed through the open outlet channels 5. As a result of this arrangement of the absorbing material, the incident surface was increased by a ratio of 1:1.6 from 2 dm² to 3.2 dm². The bed thickness was 20 mm. A total of 13,630 kg of nitrogen as ammonia was oxidised with air to nitrous gases in the course of an experiment lasting altogether 795 hours. The average temperature of the platinum gauze was 855° C and that of the absorbing material 820° C. The feed rate corresponds to a specific throughput of the platinum gauze bundle of 8.57 kg of N/hour/dm² of catalyst surface and a throughput of 5.36 kg of N/hour/ dm² in accordance with the increased incident surface.

There was a loss of altogether 5,458 mg of Pt at the catalyst, of which 5,067 mg. was recovered by working up the CaO absorbing material, which corresponds to a recovery figure of 92.8%. After the conclusion of the experiment it was not possible to detect any tendency to caking.

What we claim is:

1. A device for the recovery of a noble metal from a combustion furnace of the type having a noble metal gauze arranged across the furnace in a direction transverse to the flow of gas therethrough, said device comprising:

a noble metal absorbing and intercepting bed supported on a base, said bed being in the form of channels defined by gas permeable walls supported on said base and extending in a direction transverse to said gauze, a first plurality of said channels being filled with granular acid-soluble alkaline earth metal oxide material, said material filled channels having a thickness, taken in the direction of gas flow therethrough, of 20 to 40 mm, said material filled channels separating a second plurality of open channels, a first portion of said open channels being open only at the ends thereof toward said gauze and comprising gas inlet channels, a second portion of said open channels being open only at the ends thereof farthest spaced from said gauze and comprising gas outlet channels, whereby gas flows from said furnace into said inlet channels and then laterally through said material filled channels into said outlet channels, said bed having a total external gas incident surface of 1.5 to 20 times the cross-sectional area encompassed by said material filled channels and said open channels taken in a plane parallel to said gauze.

2. A device as claimed in claim 1, wherein said material filled channels and said open channels have, in a plane parallel to said gauze, substantially elongated rectangular cross-sectional configurations.

3. A device as claimed in claim 1, wherein said material filled channels and said open channels comprise concentrically arranged cylindrically shaped elements.

4. A device as claimed in claim 1, wherein said material filled channels extend radially outwardly from substantially the center of said bed, and said open channels are sector-shaped channels.

5. A device as claimed in claim 1, wherein said material filled channels comprise hollow tubes each having a central passage therethrough, said first portion of said open channels comprises the space outwardly of all said hollow tubes, and said second portion of said open channels comprise said central passages through said hollow tubes.

6. A device as claimed in claim 1, wherein said material filled channels and said open channels have hexagonal cross-sectional configurations.

* * * * *